(12) United States Patent
Prima et al.

(10) Patent No.: US 11,292,424 B2
(45) Date of Patent: Apr. 5, 2022

(54) GAS GENERATOR FOR A SAFETY SYSTEM

(71) Applicant: Autoliv Development AB, Vargarda (SE)

(72) Inventors: Gerald Prima, Landrevarzec (FR);
Ludovic Pogeant, Quimper (FR);
Matthew A. Cox, Centerville, UT (US);
Kevin Smith, Bountiful, UT (US)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 16/955,358

(22) PCT Filed: Dec. 22, 2017

(86) PCT No.: PCT/EP2017/084561
§ 371 (c)(1),
(2) Date: Jun. 18, 2020

(87) PCT Pub. No.: WO2019/120591
PCT Pub. Date: Jun. 27, 2019

(65) Prior Publication Data
US 2021/0016740 A1    Jan. 21, 2021

(51) Int. Cl.
*B60R 21/264* (2006.01)
*F42B 3/04* (2006.01)
(Continued)

(52) U.S. Cl.
CPC .............. *B60R 21/264* (2013.01); *F42B 3/04* (2013.01); *B60R 21/261* (2013.01); *B60R 2021/2648* (2013.01); *B60R 2021/26076* (2013.01)

(58) Field of Classification Search
CPC .............. B60R 21/264; B60R 21/2644; B60R 2021/2648; B60R 21/261; B60R 2021/26076; F42B 3/04
See application file for complete search history.

(56) References Cited

U.S. PATENT DOCUMENTS 5,104,466 A * 4/1992 Allard ................. B60R 21/2644
149/110
5,613,706 A * 3/1997 Parker ................. B60R 21/2644
102/202
(Continued)

FOREIGN PATENT DOCUMENTS

FR         2 922 007 A1    4/2009
WO      2009/043904 A2    4/2009
WO      2017/103135 A1    6/2017

OTHER PUBLICATIONS

International Search Report of the International Searching Authority for PCT/EP2017/084561 dated Jul. 9, 2018.
(Continued)

*Primary Examiner* — Jonathan Ng
*Assistant Examiner* — Daniel M. Keck
(74) *Attorney, Agent, or Firm* — Harness, Dickey & Pierce, P.L.C.; Stephen T. Olson

(57) ABSTRACT

Gas generator for a safety system, comprising: at least one pyrotechnic substance arranged to produce gases; a first part; a second part; a third part; and a fourth part separate from the previous parts, the first part and the second part being friction-welded to the third part. The gas generator is characterised in that the fourth part comprises: a first interface for positioning with the first part, and a second interface for positioning with the second part, such as to temporarily block at least one degree of freedom between the first and second parts in order to allow the first and second parts to be simultaneously friction-welded to the third part.

18 Claims, 3 Drawing Sheets

(51) Int. Cl.
*B60R 21/261* (2011.01)
*B60R 21/26* (2011.01)

(56) References Cited

U.S. PATENT DOCUMENTS

| | | | |
|---|---|---|---|
| 5,787,563 A * | 8/1998 | Jenkins | B60R 21/268 |
| | | | 219/91.2 |
| 8,925,464 B1 * | 1/2015 | Quioc | B60R 21/264 |
| | | | 102/530 |
| 10,549,714 B2 | 2/2020 | Prima et al. | |
| 2019/0184931 A1 * | 6/2019 | Prima | F42B 3/04 |

OTHER PUBLICATIONS

English translation of International Search Report of the International Searching Authority for PCT/EP2017/084561 dated Jul. 9, 2018.

* cited by examiner

A-A

A-A

B-B

C-C

GAS GENERATOR FOR A SAFETY SYSTEM

FIELD

This invention relates in general to a gas generator for a safety system such as an airbag, and more particularly a gas generator, the components of which are assembled by friction-welding, such as inertia welding.

BACKGROUND

Generators assembled according to a welding process are known from the prior art and described in document WO2017103135. This document proposes simultaneously welding a first and a second part to a third, the weld zones of the first and of the second part being very close to one another. This proximity of the weld zones may, in some cases, degrade certain characteristics of the welds in terms of a level of leaktightness. Indeed, the weld zones may influence one another or deform the adjacent welded part.

SUMMARY

One aim of the present invention is to resolve the disadvantages of the aforementioned prior art document, and in particular, first of all, to propose a gas generator, the welds of which are improved.

To that end, a first aspect of the invention relates to a gas generator for a safety system, comprising:
at least one pyrotechnic substance arranged to produce gases,
a first part,
a second part,
a third part,
and a fourth part separate from the previous parts,
the first part and the second part being friction-welded to the third part, characterized in that the fourth part comprises:
a first interface for positioning with the first part,
a second interface for positioning with the second part,
such as to temporarily block at least one degree of freedom between the first and second parts in order to allow the first and second part to be simultaneously friction-welded to the third part.

The friction-welding operation uses the friction between two parts that rotate relative to one another along a weld axis in order to generate heat at the interface of the two parts and to assemble them, due to their melting, when a force is applied along the weld axis.

To this end, in the present application, the second part is positioned reversibly (until the welding operation) relative to the first part, via the fourth part. Once this sub-assembly has been formed, it is subsequently welded by the friction-welding operation to the third part. Thus, the first part and the second part are simultaneously welded to the third part in one and the same single welding operation. During the welding operation, weld beads are generated at the contact zones between the first part and the third part and between the second part and the third part.

The fourth part makes it possible to improve the positioning of the second part relative to the first, so as to improve the quality of the welds generated during the friction-welding operation. Indeed, the fourth part makes it possible to limit, or even dispense with, contacts between the first and the second part. This makes it possible to leave room for the weld beads as they are formed.

By blocking at least one degree of freedom between the first and the second part, the fourth part, by the first and the second positioning interface, blocks at least one translation of the second part relative to the first, typically along the weld axis of the friction-welding operation. The fourth part may also make it possible to block a rotation of the second part relative to the first, typically about or along the weld axis of the friction-welding operation.

At least one degree of freedom is temporarily blocked when the first, second and fourth parts form a sub-assembly before the friction-welding operation. Once the friction-welding operation, it is a weld between the first and the third part on the one hand and a weld between the second and the third part on the other hand which fix the positioning of the second part relative to the first part.

The second part is advantageously mounted in the first part.

Advantageously, the first positioning interface and the second positioning interface are arranged such that a rotational or translational movement of the first part during the friction-welding operation carries along the second part. In other words, the fourth part makes it possible to avoid any relative rotational and/or translational movement between the first and the second part. In other words, the second part is carried along by the first, via the fourth part.

Advantageously:
the first part comprises a first welding interface,
the second part comprises a second welding interface, and a space is defined between the second welding interface and the first welding interface before the operation of simultaneous friction-welding of the first and second parts to the third part.

A welding interface is a portion of the part which is physically affected by the welding operation. Typically, for a friction-welding operation, a welding interface is a part end of cylindrical or circular-cylindrical shape and of a predetermined thickness. Guaranteeing a space between the welding interface of the first part and the welding interface of the second part makes it possible to avoid any interference which might appear between a bead generated during the welding of the first welding interface and another bead generated during the welding of the second welding interface. Contact between the two beads, in particular at the start of welding, can degrade one or the other of the welds and in particular the leaktightness of the welds. The leaktightness provided by the friction-welding makes it possible to guarantee storage of the pyrotechnic substance away from water for a long time (up to 15 years, for example).

Advantageously, before the friction-welding operation, the space defined between the second welding interface and the first welding interface is between a thickness of the second part at the second welding interface and a thickness of the first part at the first welding interface.

A tailored space makes it possible to best utilize the heat emitted during the friction-welding operation, while guaranteeing the necessary space for the formation of the weld beads. This is particularly beneficial when the thickness of one of the parts at its welding interface is markedly different from the other part.

For example, when a thickness of the second part at the second welding interface is between 33% and 66% of a thickness of the first part at the first welding interface and/or when the thickness of the second part at the second welding interface is between 33% and 66% of a thickness of the third part facing the second welding interface.

Indeed, in order to guarantee a robust weld, it is necessary to reach a given temperature at the welded zone, said temperature is reached with certain welding parameters (rotational speed, force applied during the operation, etc.).

When there is a thickness differential between two welded parts, the difficulty lies in sufficiently heating the thicker part without thereby reaching temperatures that are too high which could degrade the thinner part. A small space, as claimed, makes it possible to use the heating generated by the friction of the first part on the third part (the thickest parts) for the welding of the second (thinnest) part to the third part.

Typically, a space of between 1 mm and 3 mm can be provided.

The space is measured between the inside of the first part and the outside of the second part at their respective welding interfaces along a direction perpendicular to a weld axis. In other words, the space corresponds to the difference between an inner radius of the first part at the first welding interface and an outer radius of the second part at the second welding interface.

Advantageously, the first positioning interface and the second positioning interface are arranged so as to temporarily block six degrees of freedom between the first and the second part before the friction-welding operation.

In other words, there is no contact between the first and the second part before the welding operation. The space between the two parts is free during the formation of the weld beads of the two parts. This makes it possible to ensure optimal positioning of the second part in order to guarantee a robust weld.

Advantageously, the first part is a chamber containing the pyrotechnic substance, the second part is a cover plate and the third part is a diffuser.

This embodiment makes it possible to close the chamber in a leaktight manner using the cover plate, without a direct leaktight link between the cover plate and the chamber.

Advantageously, the fourth part is a grate arranged to hold the pyrotechnic substance during operation of the gas generator.

In this embodiment, the fourth part has two functions, namely the positioning of the second part relative to the first, before and during the welding phase, and the holding of the pyrotechnic substance during the operation of the generator. The construction of the generator is therefore optimized, since the number of parts forming it is limited.

Advantageously, before the friction-welding operation, a thickness of the second part at the second welding interface is between 33% and 66% of a thickness of the first part at the first welding interface.

The invention makes it possible to simultaneously weld two parts of different thicknesses to the third part. This is particularly advantageous when the aim is to close a chamber which has to withstand combustion of a pyrotechnic substance with a cover plate which has to yield to a predetermined pressure.

Advantageously, the thickness of the second part at the second welding interface is between 33% and 66% of a thickness of the third part facing the second welding interface.

Advantageously, the thickness of the second part at the second welding interface is between 0.5 and 1 mm and the thickness of the first part at the first welding interface is between 1.3 and 3 mm.

Advantageously, before the friction-welding operation, when the first, second and third part form a sub-assembly, a second weld plane formed by the second welding interface is offset from a first weld plane formed by the first welding interface (or arranged at or under the first weld plane of the first welding interface) such that the second part touches the third part simultaneously as, or preferentially after, the first part touches the third part.

This makes it possible to limit risks of buckling of the second welding interface during the friction-welding operation.

Advantageously, a diameter circumscribed at the second welding interface is the largest circumscribed diameter of the second part.

According to this embodiment, the second welding interface is subjected less to deformation during the welding operation and in particular a forging force. Uncontrolled deformation is detrimental since, if the welding interface gives way during the welding, the weld bead will not be formed correctly and the weld quality will be degraded. In other words, the second welding interface is a wall of a circular-cylindrical part, the first fold of which is a fold toward an axis of revolution of the part. The axis of revolution of the part is combined with the weld axis during the friction-welding operation.

Advantageously, the first interface for positioning the fourth part has a continuous contact surface with the first part.

The continuous contact surface makes it possible to prevent any weld projection (typically an incandescent shaving) passing to the first interface. Such a projection could ignite the pyrotechnic substance when the latter is loaded inside the first part.

Advantageously, the first and second welding interfaces have a cylindrical form.

Cylindrical welding interfaces, and in particular circular-cylindrical welding interfaces, are particularly suited to friction-welding.

Advantageously:
the first, second and fourth parts have bowl forms with a bottom and a lateral surface,
a portion of the outer lateral surface of the fourth part bears against a portion of the inner lateral surface of the first part, and a portion of the outer lateral surface of the second part bears against a portion of the inner lateral surface of the fourth part.

In other words, the second and fourth parts are contained in the first part. In addition, this enables compact nesting of the first, second and fourth parts.

Advantageously, the second positioning interface is a male form complementary to a female form of the second part.

These forms enable good meshing of the second part with the fourth part, in order to block any relative rotation of one part relative to the other.

Advantageously, the gas generator comprises a fifth part positioned between the second and the third part, the female form of the second part being arranged to position the fifth part relative to the third part.

The fifth part may be a filter. The second part makes it possible to guarantee the presence of a space between the filter and the third part, in particular when the third part is a diffuser. The gas flows during operation of the generator are optimized.

Advantageously:
the second positioning interface is formed by a junction between the lateral surface and the bottom of the fourth part, and
the female form of the second part is formed by a junction between the lateral surface and the bottom of the second part.

Formed in this way, the second part is easier to manufacture, simpler and stronger, since the female form, in addition to participating in the positioning of the second part, participates in reinforcing the junction the lateral surface and the bottom of the second part. The same applies for the fourth part.

Advantageously:
the first positioning interface is a female form complementary to a male form of the first part,
the first positioning interface is formed by a junction between the lateral surface and the bottom of the fourth part, and
the male form of the first part is located on the lateral surface of the first part.

When the fourth part is inside the first part, the male form of the first part is located on the inner lateral surface of the first part.

A second aspect of the invention relates to a safety module comprising a gas generator according to the first aspect of the invention.

A third aspect of the invention relates to a motor vehicle comprising a gas generator according to the first aspect of the invention.

A final aspect of the invention relates to a process for manufacturing a gas generator according to the first aspect, comprising the steps of:
positioning the fourth part on the first part via the first positioning interface,
positioning the second part on the fourth part via the second positioning interface,
carrying out the operation of simultaneous friction-welding of the first and second parts to the third part.

In other words, the manufacturing process proposes forming a sub-assembly by assembling, reversibly until the friction-welding operation, the first, second and fourth part before welding the sub-assembly to the third part.

Advantageously, the welding operation comprises a step of:
holding the first part with a welding tool,
the fourth part making it possible, via the first and second positioning interface, to avoid any relative movement of the second part relative to the first part.

"Avoid any movement" is intended to mean preventing any movement which would not make it possible to obtain a weld whose criteria of leaktightness and strength do not meet the criteria necessary for the manufacture of gas generators.

DRAWINGS

Other features and advantages of the present invention will be seen more clearly from the following detailed description of an embodiment of the invention provided by way of a non-limiting example and illustrated by the appended drawings, wherein:

FIG. 4 shows a sectional view of the generator from FIG. 3a, along the B-B axis defined in FIG. 3a.

DETAILED DESCRIPTION

Figure 1:
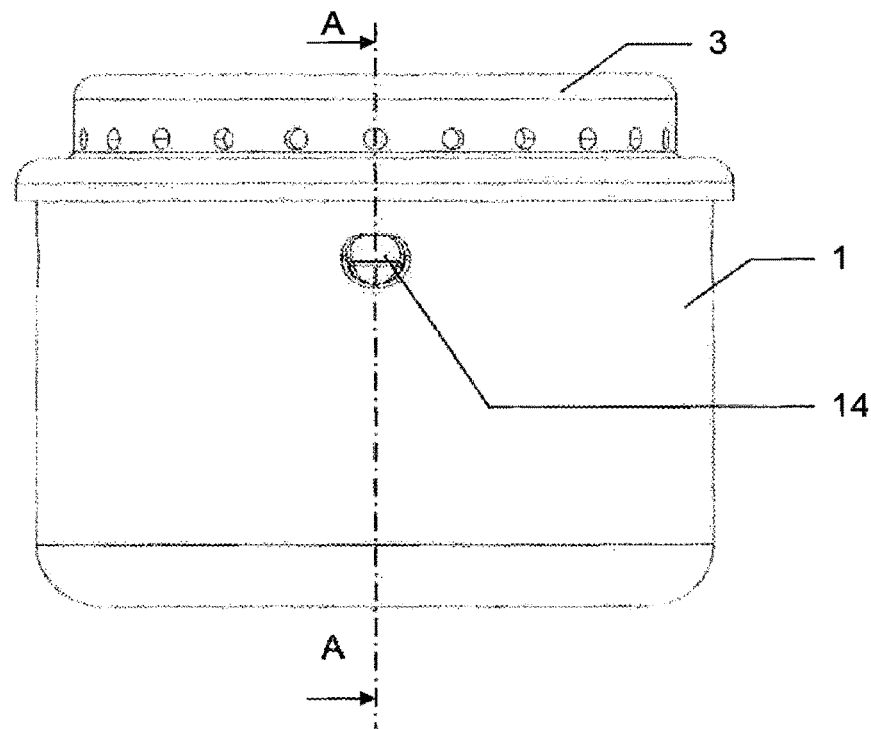
FIG. 1 shows a side view of a generator according to the invention.

FIG. 1 shows a gas generator for airbag of discoid form, generally used for frontal protection, and comprises a first part forming a chamber 1 which is welded to a third part forming a diffuser 3. The diffuser 3 comprises diffusion holes at the periphery thereof, in order to diffuse, in an airbag which is not shown, combustion gases from a pyrotechnic substance 6 contained in the gas generator.

Figure 3A:
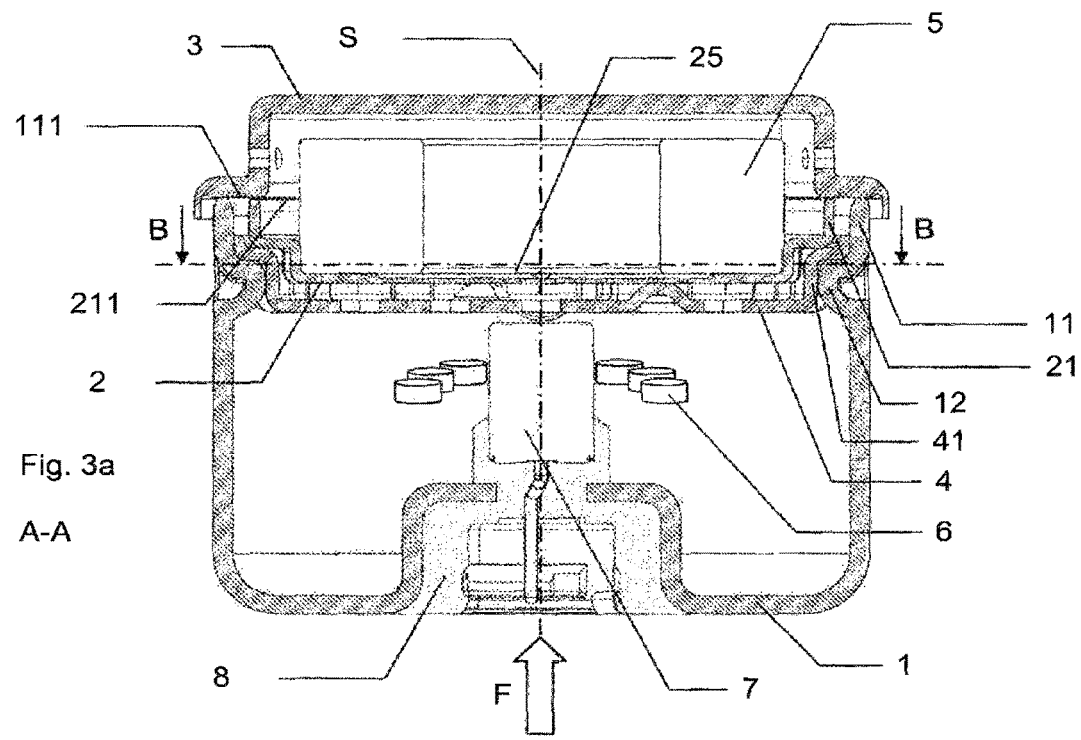
FIG. 3a shows a sectional view of the generator from FIG. 1, before a friction-welding operation, along the A-A axis defined in FIG. 1.

The lateral surface of the chamber 1 comprises deformations 14 which are the parts visible from the outside of the generator, of male forms 12 visible in FIG. 3a.

Figure 2:
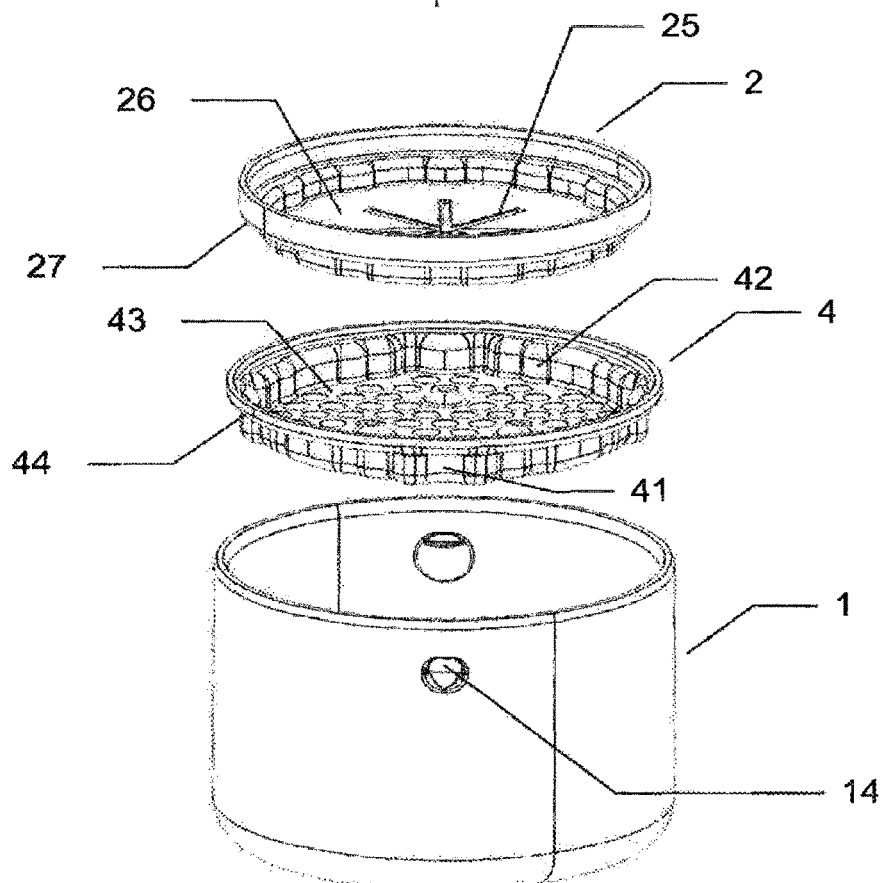
FIG. 2 shows an exploded isometric view of certain components of the generator from FIG. 1.

FIG. 2 shows three components of the unassembled gas generator according to an isometric view: the chamber 1, a second part which is a cover plate 2 and a third part which is a grate 4.

The chamber 1 and the diffuser 3 are the thickest components, since they have to withstand the operating pressure of the generator, during the combustion of the pyrotechnic substance. It is possible to provide a thickness within a range extending from 1.3 mm to 3.5 mm.

The cover plate 2 has weak zones 25 which are thinner zones arranged to break at a predetermined pressure during the operation of the generator. Since the cover plate 2 does not have to withstand the operating pressure, it can be thinner, for example between 33 and 66% thinner than the chamber 1 or the diffuser 3. It is possible to provide a thickness within a range extending from 0.3 mm to 1.2 mm.

The grate 4 comprises a first interface for positioning 41 with the chamber 1 and a second interface for positioning 42 with the cover plate 2. The bowl form of the grate 4 and of the cover plate 2 can be clearly seen in this view. The grate 4 comprises a bottom 43 and a lateral surface 44 while the cover plate 2 comprises a bottom 26 and a lateral surface 27.

FIG. 3a shows a sectional view of the generator from FIG. 1, before a friction-welding operation, along the A-A axis defined in FIG. 1. The generator comprises a pyrotechnic substance 6 defined so as to produce gas when it is ignited by an electro-pyrotechnic initiator 7. The initiator 7 is connected in a leaktight manner to the chamber 1 by an overmolding 8. Before being diffused into the airbag, the gases are cooled by a filter 5.

This view before welding makes it possible to visualize the sub-assembly composed of the chamber 1 containing the pyrotechnic substance 6 and the grate 4 and closed by the cover plate 2 which is in the position to be welded to the diffuser 3. For this purpose, the diffuser 3 is caused to rotate about the weld axis S and, during the rotational movement, the sub-assembly is pressed with a force F onto the diffuser 3.

To this end, the chamber 1 comprises a first welding interface 11 defining a first weld plane 111 while the cover plate 2 comprises a second welding interface 21 defining a second weld plane 211. The second weld plane 211 is located under the first weld plane, that is to say that the second weld plane 211 is contained inside a volume formed by the chamber 1 closed by the first weld plane 111. In other words, during the application of force F during the welding operation, the first weld plane 111 touches the diffuser 3 before the second weld plane. Typically, the offset is approximately 0.5 mm±0.25 mm.

The first positioning interface 41 makes it possible to position the grate 4 relative to the chamber 1 along a direction perpendicular to the weld axis S and also positions the grate 4 in the chamber 1.

Figure 3B:
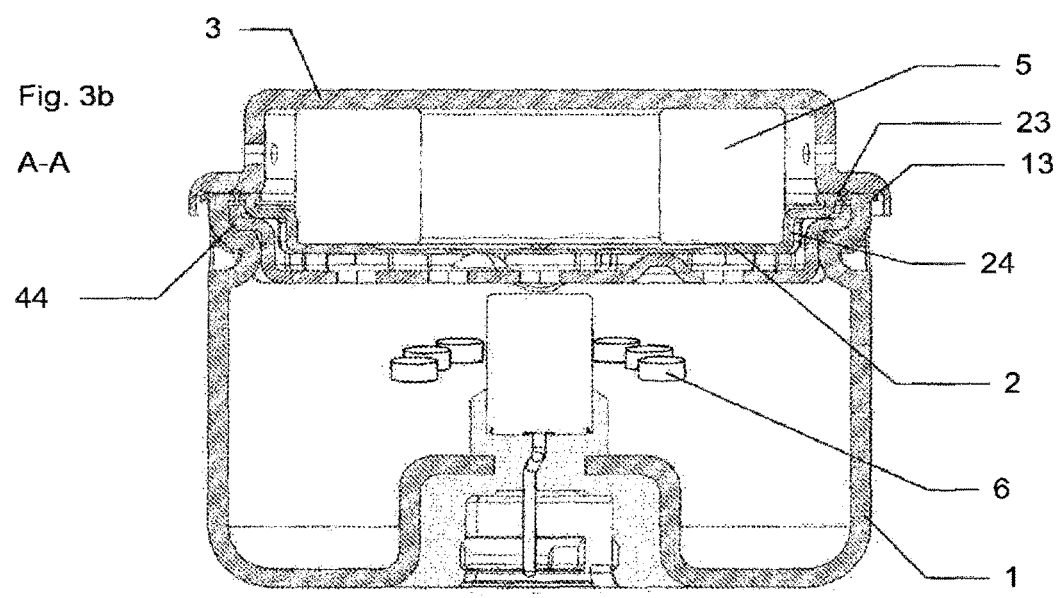
FIG. 3b shows the generator from FIG. 3a after the friction-welding operation.

FIG. 3b shows the generator from FIG. 3a after the welding operation. The filter 5 is in contact both on the cover plate 2 and on the diffuser 3. The cover plate 2 comprises a hollow female form 24 which makes it possible to position the filter 5 relative to the diffuser 3 and in particular to guarantee a radial space between the filter and an inner surface of the diffuser 3 so as to ensure an unrestricted flow of the gases produced by the pyrotechnic substance 6 during the operation of the gas generator.

A portion of the first welding interface 11 has disappeared in the form of a first weld bead 13 between the chamber 1 and the diffuser 3. A portion of the second welding interface 21 has disappeared in the form of a second weld bead 23 between the cover plate 2 and the diffuser 3.

The grate 4 has a lateral surface 44 in continuous contact with an inner surface of the first part 1. This limits any risk of projection of weld particles toward the pyrotechnic substance through the first positioning interface 41.

Figure 4:
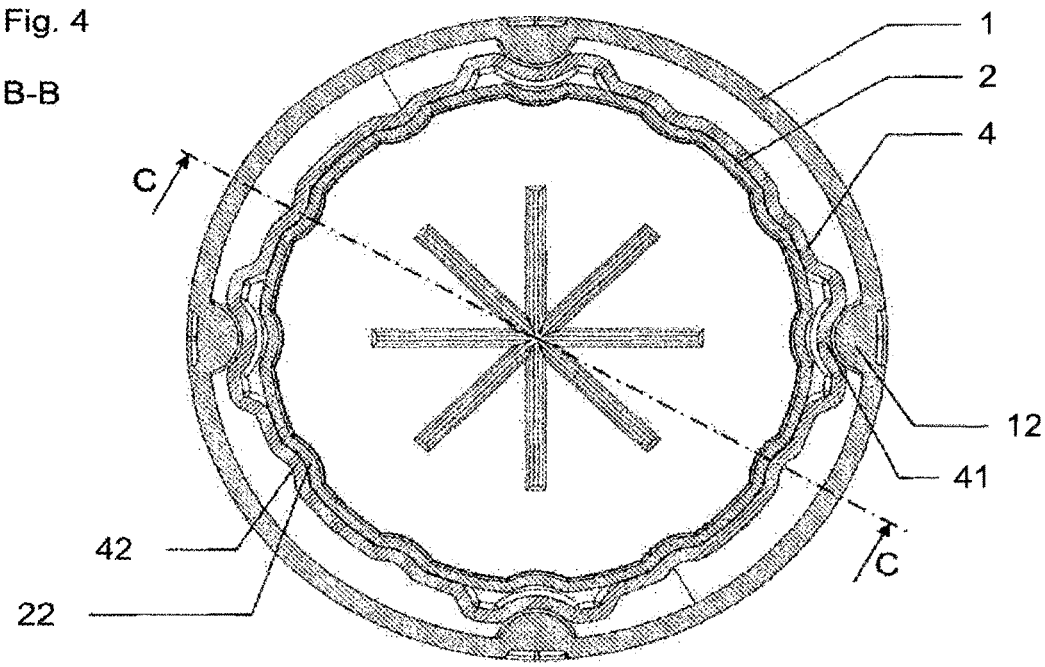

FIG. 4 shows a sectional view of the generator from FIG. 3a, along the B-B axis defined in FIG. 3a. The first and second positioning interfaces of the grate 4 are more clearly visible.

The first interface 41 is a female form positioned on an outer lateral surface of the grate. Its form is complementary to a male form 12 formed on an inner lateral wall of the chamber 1, so as to avoid any rotation of the grate 4 about the weld axis S relative to the chamber 1. This embodiment comprises four first interfaces 41. This number is to be adjusted depending on the forces required for the welding operation.

The second interface 42 is a male form positioned on an inner lateral surface of the grate. Its form is complementary to a female form 22 formed on an outer lateral wall of the cover plate 2, so as to avoid any rotation of the cover plate 2 about the weld axis S relative to the grate 3. This embodiment comprises eight first interfaces 42. This number is to be adjusted depending on the forces required for the welding operation.

Figure 5:
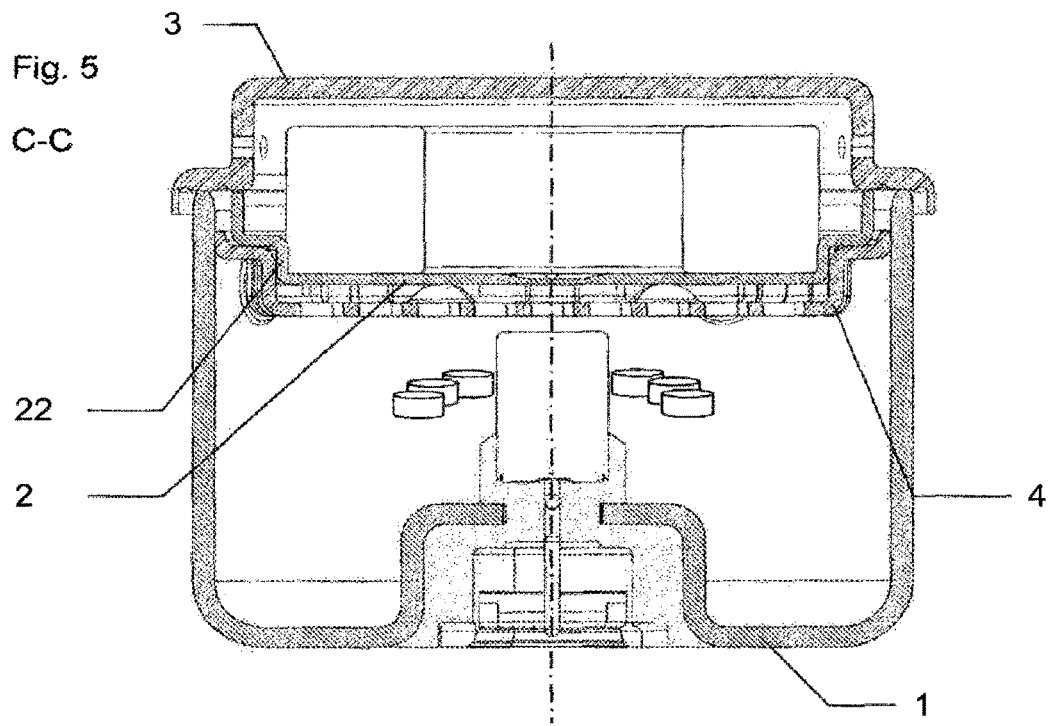
FIG. 5 shows a sectional view of the generator from FIG. 4, along the C-C axis defined in FIG. 4.

FIG. 5 shows a sectional view of the generator from FIG. 4, along the C-C axis defined in FIG. 4. It makes it possible to more clearly visualize the interaction between the second positioning interface 42 and the cover plate 2 in particular at the female form 22. The second positioning interface 42 makes it possible to position the cover plate 2 relative to the grate 4 along a direction perpendicular to the weld axis S and also positions the cover plate 2 in the chamber 1 along the weld axis S. In other words, the second positioning interface 42 serves as an axial stop for the cover plate 2, in particular during the welding operation. Thus, the second welding interface 21 cannot give way, in particular due to bending of the cover plate 2, during the application of force F during the welding operation. In this embodiment, the welding interface is thus supported, along the weld axis S, over more than 70% of its periphery. This makes it possible to ensure satisfactory leaktightness of the weld. It is possible to carry out a helium leak test in order to verify that the weld meets the current leaktightness specifications in automotive safety, such as standard USCAR-24, 2nd revision of April 2013. For example, for an entirely pyrotechnic generator, a combustion chamber with a helium leak rate of less than $1.10^{-4}$ $cm^3 \cdot atm^{-1} \cdot s^{-1}$ can be considered to be leaktight (with 100% helium initially in the combustion chamber).

The second welding interface 21 is a circular-cylindrical wall of axis S. The first fold present along the wall is a fold toward the inside of the part, i.e. toward axis S. Thus, a diameter circumscribed at the second welding interface 21 is the largest circumscribed diameter of the cover plate 2. This yet further reduces any risk of bending of the welding interface 21 during the welding operation.

It will be understood that various modifications and/or improvements obvious to those skilled in the art can be made to the different embodiments of the invention described in the present description, without departing from the scope of the invention as defined by the appended claims. In particular, reference is made to a chamber 1 as first part, a cover plate as second part and a diffuser 3 as third part. The invention can be applied to all other parts of a gas generator that are friction-welded.

The invention claimed is:

1. A gas generator for a safety system, comprising:
at least one pyrotechnic substance arranged to produce gases;
a first part;
a second part;
a third part; and
a fourth part separate from the first, second and third parts, the first part and the second part being friction-welded to the third part, the fourth part including:
a first interface for positioning with the first part; and
a second interface for positioning with the second part, such as to temporarily block at least one degree of freedom between the first and second parts in order to allow an operation of simultaneous friction welding of the first and second parts to the third part.

2. The gas generator according to the claim 1, wherein the first positioning interface and the second positioning interface are arranged such that a rotational or translational movement of the first part during the friction welding operation carries along the second part.

3. The gas generator according to claim 1, wherein:
the first part comprises a first welding interface,
the second part comprises a second welding interface, and
a space is defined between the second welding interface and the first welding interface before the operation of simultaneous friction welding of the first and second parts to the third part.

4. The gas generator according to claim 1, wherein the first positioning interface and the second positioning interface are arranged so as to temporarily block six degrees of freedom between the first and the second part before the friction welding operation.

5. The gas generator according to claim 1, wherein the first part is a chamber containing the pyrotechnic substance, the second part is a cover plate and the third part is a diffuser.

6. The gas generator according to claim 1, wherein the fourth part is a grate arranged to hold the pyrotechnic substance during operation of the gas generator.

7. The gas generator according to claim 1, wherein, before the friction welding operation, a thickness of the second part at the second interface is between 33% and 66% of a thickness of the first part at the first interface.

8. The gas generator according to claim 1, wherein a diameter circumscribed at the second interface is the largest circumscribed diameter of the second part.

9. The gas generator according to claim 1, wherein the first interface for positioning the fourth part has a continuous contact surface with the first part.

10. The gas generator according to claim 1, wherein the first and second interfaces have a cylindrical form.

11. The gas generator according to claim 1, wherein the first, second and fourth parts have bowl forms with a bottom and a lateral surface,
  wherein a portion of the outer lateral surface of the fourth part bears against a portion of the inner lateral surface of the first part, and
  wherein a portion of the outer lateral surface of the second part bears against a portion of the inner lateral surface of the fourth part.

12. The gas generator according to claim 10, wherein the second positioning interface is formed by a junction between the lateral surface and the bottom of the fourth part, and
  wherein a female form of the second part is formed by a junction between the lateral surface and the bottom of the second part.

13. A safety module comprising a gas generator according to claim 1.

14. A motor vehicle comprising a safety module according claim 1.

15. A process for manufacturing a generator according to claim 1, comprising the operations of:
  positioning the fourth part on the first part via the first positioning interface,
  positioning the second part on the fourth part via the second positioning interface, and
  carrying out the operation of simultaneous friction welding of the first and second parts to the third part.

16. The gas generator according to claim 1, wherein the first part and the third part cooperate to define an interior of the generator, the fourth part disposed in the interior.

17. The gas generator according to claim 16, wherein the second part is disposed in the interior.

18. A gas generator for a safety system, comprising:
  a housing defining a chamber for at least one pyrotechnic substance for producing produce gases;
  a cover plate;
  a diffuser; and
  a grate separate from the housing, the cover plate and the diffuser,
  the housing and the cover plate being friction-welded to the diffuser,
  the grate including:
    a first interface for positioning with the housing; and
    a second interface for positioning with the cover plate, the grate operative to temporarily block at least one degree of freedom between the housing and cover plate for simultaneous friction welding of the housing and cover plate to the diffuser.

* * * * *